US008568545B2

(12) United States Patent
Lindgren et al.

(10) Patent No.: US 8,568,545 B2
(45) Date of Patent: *Oct. 29, 2013

(54) AUTOMATED MATERIAL REMOVAL IN COMPOSITE STRUCTURES

(75) Inventors: Lawrence S. Lindgren, Redmond, WA (US); Scott W. Lea, Renton, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 82 days.

This patent is subject to a terminal disclaimer.

(21) Appl. No.: 12/485,832

(22) Filed: Jun. 16, 2009

(65) Prior Publication Data
US 2010/0316458 A1 Dec. 16, 2010

(51) Int. Cl.
B32B 41/00 (2006.01)
(52) U.S. Cl.
USPC ............. 156/64; 156/350; 156/351; 156/353; 156/360; 156/367; 156/378; 156/379
(58) Field of Classification Search
USPC ........... 156/64, 350, 351, 353, 360, 367, 378, 156/379
See application file for complete search history.

(56) References Cited

U.S. PATENT DOCUMENTS

| | | |
|---|---|---|
| 2,771,090 A | 11/1956 | MacGregor et al. |
| 3,724,808 A | 4/1973 | Sugden, Jr. |
| 3,792,713 A | 2/1974 | Zadoo |
| 3,963,044 A | 6/1976 | Brown |
| 4,089,493 A | 5/1978 | Paulson |
| 4,588,626 A | 5/1986 | Cologna et al. |
| 4,820,564 A | 4/1989 | Cologna et al. |
| 4,961,799 A | 10/1990 | Cologna et al. |
| 5,023,987 A | 6/1991 | Wuepper et al. |
| 5,034,254 A | 7/1991 | Cologna et al. |
| 5,207,541 A * | 5/1993 | Westerman et al. .......... 409/179 |
| 5,337,149 A | 8/1994 | Kozah et al. |
| 5,477,459 A | 12/1995 | Clegg et al. |
| 5,532,933 A * | 7/1996 | Nakata .......................... 700/182 |
| 5,590,268 A | 12/1996 | Doi et al. |

(Continued)

FOREIGN PATENT DOCUMENTS

| | | |
|---|---|---|
| DE | 102005025470 A1 | 12/2006 |
| EP | 0359660 A1 | 3/1990 |

(Continued)

OTHER PUBLICATIONS

Abdul-Aziz et al., "A CAD Approach to Integrating NDE with Finite Element," National Aeronautics and Space Administration, NASA TM-2004-212904, Apr. 2004, 30 pages.
Abdul-Aziz et al., "Nondestructive Evaluation Correlated with Finite Element Analysis," http://www.grc.nasa.gov/WWW/RT/RT1998/5000/5920aziz.html, Jun. 16, 1999, 5 pages.
Frankle, "Application of NDE Data to Finite Element Analysis of Parts Containing Defects," In: Damage Detection in Composite Materials, Masters (Ed.), American Society for Testing and Materials, Philadelphia, PA, 1992, pp. 85-100.
International Search Report, dated Feb. 8, 2010, regarding Application No. PCT/US2008/077178 (WO2009045770), 5 pages.

(Continued)

*Primary Examiner* — Katarzyna Wyrozebski Lee
*Assistant Examiner* — Joshel Rivera
(74) *Attorney, Agent, or Firm* — Yee & Associates, P.C.

(57) ABSTRACT

A composite structure containing an out-of-tolerance area is restored using an automated material removal method. The location of an out-of-tolerance area within the structure is determined by non-destructive inspection and a volume of the structure to be removed is selected based on the location of the out-of-tolerance area. An automatic material removal tool is programmed and used to remove the selected volume of material. The volume of removed material may be is replaced by an integrated patch.

17 Claims, 8 Drawing Sheets

(56) References Cited

U.S. PATENT DOCUMENTS

| | | |
|---|---|---|
| 5,590,900 A | 1/1997 | Duran et al. |
| 5,827,598 A | 10/1998 | Larsen et al. |
| 5,882,756 A | 3/1999 | Alston et al. |
| 6,084,206 A | 7/2000 | Williamson et al. |
| 6,174,392 B1 | 1/2001 | Reis |
| 6,182,688 B1 | 2/2001 | Fabre |
| 6,373,028 B2 | 4/2002 | Williamson et al. |
| 6,579,481 B2 | 6/2003 | Auman |
| 6,618,133 B2 | 9/2003 | Hedges et al. |
| 6,630,993 B1 | 10/2003 | Hedges et al. |
| 6,697,067 B1 | 2/2004 | Callahan et al. |
| 6,736,354 B2 | 5/2004 | Goto et al. |
| 6,761,783 B2 | 7/2004 | Keller et al. |
| 6,997,415 B2 | 2/2006 | Wozniak et al. |
| 7,194,326 B2 | 3/2007 | Cobb et al. |
| 7,305,277 B2 | 12/2007 | Freeman et al. |
| 7,361,412 B2 | 4/2008 | Wang et al. |
| 7,368,073 B2 | 5/2008 | Krogager et al. |
| 7,398,698 B2 | 7/2008 | Griess et al. |
| 7,447,598 B2 | 11/2008 | Malkin et al. |
| 7,448,270 B2 | 11/2008 | Kollgaard |
| 7,458,543 B2 | 12/2008 | Cutler et al. |
| 7,467,052 B2 | 12/2008 | Vaccaro |
| 7,617,730 B2 | 11/2009 | Georgeson |
| 7,627,447 B2 | 12/2009 | Marsh et al. |
| 7,657,117 B2 | 2/2010 | Saund et al. |
| 7,703,327 B2 | 4/2010 | Georgeson et al. |
| 7,849,729 B2 | 12/2010 | Miller et al. |
| 7,857,925 B2 | 12/2010 | Keller et al. |
| 7,859,655 B2 | 12/2010 | Troy et al. |
| 7,873,494 B2 | 1/2011 | Hadley et al. |
| 7,886,642 B2 | 2/2011 | Barker |
| 8,044,991 B2 | 10/2011 | Lea et al. |
| 8,197,623 B1 | 6/2012 | Westerman |
| 8,218,852 B2 | 7/2012 | Cork et al. |
| 2002/0060018 A1 | 5/2002 | Lindsay et al. |
| 2006/0053891 A1 | 3/2006 | Georgeson et al. |
| 2006/0132467 A1 | 6/2006 | Saund et al. |
| 2006/0278761 A1 | 12/2006 | Cutler et al. |
| 2007/0095140 A1 | 5/2007 | Kollgaard |
| 2007/0100582 A1 | 5/2007 | Griess et al. |
| 2007/0118313 A1 | 5/2007 | Vaccaro |
| 2008/0000299 A1 | 1/2008 | Georgeson |
| 2008/0021882 A1 | 1/2008 | Pu et al. |
| 2008/0148817 A1 | 6/2008 | Miller et al. |
| 2008/0173762 A1 | 7/2008 | Crowley |
| 2008/0177411 A1 | 7/2008 | Marsh et al. |
| 2008/0183402 A1 | 7/2008 | Malkin et al. |
| 2008/0281554 A1 | 11/2008 | Cork et al. |
| 2008/0308210 A1 | 12/2008 | Keller et al. |
| 2009/0000382 A1 | 1/2009 | Sathish et al. |
| 2009/0086014 A1 | 4/2009 | Lea et al. |
| 2009/0086199 A1 | 4/2009 | Troy et al. |
| 2009/0095378 A1 | 4/2009 | Barker |
| 2010/0042361 A1 | 2/2010 | Hadley et al. |
| 2010/0111501 A1 | 5/2010 | Kashima |
| 2010/0229966 A1 | 9/2010 | Elwart et al. |
| 2010/0250148 A1 | 9/2010 | Meredith et al. |
| 2010/0274545 A1 | 10/2010 | Greenberg et al. |
| 2010/0314029 A1* | 12/2010 | Lindgren et al. ............ 156/98 |
| 2011/0096149 A1 | 4/2011 | Au et al. |

FOREIGN PATENT DOCUMENTS

| | | |
|---|---|---|
| EP | 1102211 A2 | 5/2001 |
| EP | 1400310 A1 | 3/2004 |
| EP | 1965170 A1 | 9/2008 |
| JP | 11207911 A | 8/1999 |
| WO | 0227259 A2 | 4/2002 |
| WO | 2004106847 A1 | 12/2004 |
| WO | 2006060746 A2 | 6/2006 |
| WO | 2009045770 A2 | 4/2009 |
| WO | 2010034014 A2 | 3/2010 |
| WO | 2010147733 A1 | 12/2010 |

OTHER PUBLICATIONS

International Search Report, dated Apr. 6, 2010, regarding Application No. PCT/US2009/057911 (WO2010034014), 5 pages.

Manolakis, "Efficient Solution and Performance Analysis of 3-D Position Estimation by Trilateration," IEEE Transactions on Aerospace and Electronic Systems, vol. 32, No. 4, Oct. 1996, pp. 1239-1248.

Rice et al., "Evaluating Lateration-Based Position Algorithms for Fine-Grained Tracking," DIALM-POMC '05 Proceedings of the 2005 Joint Workshop on Foundations of Mobile Computing, 2005, pp. 54-61.

Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.

Tweet et al., "Method and Apparatus for Refueling Aircraft," USPTO U.S. Appl. No. 12/468,128, filed May 19, 2009, 57 pages.

USPTO Notice of Allowance, dated Aug. 23, 2011, regarding U.S. Appl. No. 11/863,755, 10 pages.

USPTO Notice of Allowance, dated Oct. 6, 2010, regarding U.S. Appl. No. 12/235,161, 9 pages.

USPTO Office Action, dated Jul. 20, 2010, regarding U.S. Appl. No. 12/038,352, 14 pages.

USPTO Notice of Allowance, dated Sep. 22, 2010, regarding U.S. Appl. No. 12/038,352, 6 pages.

USPTO Office Action, dated Sep. 22, 2011, regarding U.S. Appl. No. 12/690,389, 9 pages.

USPTO Notice of Allowance, dated Feb. 16, 2012, regarding U.S. Appl. No. 12/690,389, 7 pages.

USPTO Office Action, dated Jul. 12, 2011, regarding U.S. Appl. No. 12/410,838, 10 pages.

USPTO Final Office Action, dated Dec. 12, 2011, regarding U.S. Appl. No. 12/410,838, 8 pages.

USPTO Office Action, dated Mar. 19, 2012, regarding U.S. Appl. No. 12/410,838, 7 pages.

USPTO Office Action, dated Nov. 9, 2011, regarding U.S. Appl. No. 12/468,128, 13 pages.

USPTO Final Office Action, dated May 9, 2010, regarding U.S. Appl. No. 12/468,128, 12 pages.

Final Office Action, dated Nov. 14, 2013, regarding USPTO U.S. Appl. No. 12/430,541, 26 pages.

Alaimo et al., "Global/Local FEM-BEM Stress Analysis of Damaged Aircraft Structures," Computer Modeling in Engineering & Sciences, vol. 36, No. 1, Oct. 2008, pp. 23-41.

Armentani et al., "DBEM and FEM analysis on non-linear multiple crack propagation in an aeronautic doubler-skin assembly," International Journal of Fatigue, vol. 28, No. 5-6, May-Jun. 2006, pp. 598-608.

International Search Report, dated Aug. 4, 2010, regarding Application No. PCT/US2010/035908 (WO2010147733), 11 pages.

Cheng et al., "Parameter Optimization for Bonding Repair of Composite Laminates Based on Neural Network," Computer Simulation, Dec. 2008, vol. 25, Issue 12, 22 pages. (English translation and original Chinese-language article).

Chu et al., "Internet-based Composite Repair," Journal of Composite Materials, May 2005, vol. 39, Issue 9, pp. 827-845.

Vlot et al., "Bonded Aircraft Repairs Under Variable Amplitude Fatigue Loading and at Low Temperatures," Fatigue & Fracture of Engineering Materials & Structures, Jan. 2000, vol. 23, Issue 1, pp. 9-18.

USPTO Office Action, dated Apr. 11, 2012, regarding U.S. Appl. No. 12/430,541, 24 pages.

* cited by examiner

AUTOMATED MATERIAL REMOVAL IN COMPOSITE STRUCTURES

TECHNICAL FIELD

This disclosure generally relates to composite structures, and deals more particularly with a method and apparatus for removing out-of-tolerance areas within such structures, especially in connection with techniques for restoring or reworking these areas.

BACKGROUND

Composite structures sometimes include localized areas that may not conform to product and/or performance specifications, for any of a variety of reasons. For example, areas of the structure may be out-of-tolerance because of inconsistencies such as, without limitation, voids, dents or porosities.

Localized areas of composite structures are sometimes reworked in order to reduce or eliminate non-conformities and thereby restore the structure. The rework process may involve removing one or more layers of material from the structure and then replacing the removed material with a composite patch that is bonded to the structure. During the material removal process, the edges of the rework area may be tapered or "scarfed" in order to form a scarf joint between the structure and the bonded patch. The rework process described above may require manual removal of the material by a skilled workman, typically using a handheld grinder or similar tool. This process is labor intensive and the accuracy of the material removal may be dependent upon the expertise of the workman. Accordingly, the consistency of the rework may vary from one rework to the next.

Accordingly, there is a need for a method and apparatus for reworking or restoring composite structures in which the localized removal of material to eliminate out-of-tolerance areas is rapid, accurate and predictable, while minimizing manual effort.

SUMMARY

The disclosed embodiments provide a method and apparatus for reworking and/or restoring out-of-tolerance areas of composite structures in which material is removed from the structure by an automated process in order to provide consistent, predictable and accurate results. An automatically controlled machine head operated by a programmed numerical controller both scans the structure in order to locate out-of-tolerance areas, and removes material from the structure based on the location of the out-of-tolerance area revealed by the scan. A tool on the machine head is used to both remove the material from the structure and form a scarf in the structure surrounding the area being reworked. The scarf forms a scarf joint between the structure and a bonded patch used to restore the out-of-tolerance area. The process of scanning the structure to locate out-of-tolerance areas and removing volumes of material may be iteratively performed to eliminate multiple out-of-tolerance areas in various layers of the structure.

According to one disclosed embodiment, a method is provided for restoring a composite structure containing an out-of-tolerance area. The location of the out-of-tolerance area is determined and a volume of the structure to be removed is selected based on the location of the out-of-tolerance area. An automatic material removal tool is programmed to remove the selected volume. The selected volume is removed by the programmed tool and then replaced by a patch. Determining the location of the out-of-tolerance area may involve moving a scanner over the surface of the structure, and selecting the volume to be removed may include selecting a layer to be removed from the structure and selecting an angle for a scarf along the edges of the layer.

According to another embodiment, a method is provided for removing one or more out-of-tolerance areas of the composite structure. The boundaries of the out-of-tolerance area within the structure are located, and are used to calculate a volume of material in the structure to be removed that includes the out-of-tolerance area. A toolpath used to guide a tool for removing material from the structure is calculated, and a controller is programmed with the calculated toolpath. The volume of material is removed from the structure using the tool, and the programmed controller may be used to control the tool. The method may further comprise selecting an angle for a scarf, wherein calculating the toolpath includes calculating a toolpath for forming the scarf having the selected scarf angle.

According to a further embodiment, apparatus is provided for removing an out-of-tolerance area in a composite structure. The apparatus comprises means for determining the location of the out-of-tolerance area within the structure, and a material removal tool. Means are provided for determining a volume of the structure to be removed which contains the out-of-tolerance area and for determining a toolpath followed by the tool to remove the volume. Automatic control means are provided for automatically controlling the movement of the tool along the toolpath. The means for determining the volume to be removed and for calculating the toolpath may include a computer, a set of data defining the geometry of the structure, and a program used by the computer to calculate the volume to be removed and to calculate the toolpath based on the geometry of the structure. The means for determining the location of the non-conforming area may include a non-destructive Inspection (NDI) type scanner that may use ultrasonic frequencies or infrared thermography for inspecting layers of material beneath a surface of the structure.

According to another embodiment, apparatus is provided for removing an out-of-tolerance area in a composite structure. A scanner is provided for internally scanning the structure and for identifying the location of an out-of-tolerance area within the structure. An automated machine tool is provided which includes a head moveable along multiple axes over the structure. A material removal tool is mounted on the head for removing material from the structure. A computer is provided which includes a program for calculating the volume of the out-of-tolerance area and for generating toolpath information used to guide the material removal tool. A controller is coupled with a computer for controlling the movement of the head and the operation of the material removal tool.

The disclosed embodiments satisfy the need for a method and apparatus for restoring out-of-tolerance areas of composite structures, which includes automated material removal that is rapid, accurate and consistent.

BRIEF DESCRIPTION OF THE ILLUSTRATIONS

DETAILED DESCRIPTION

Figure 1:
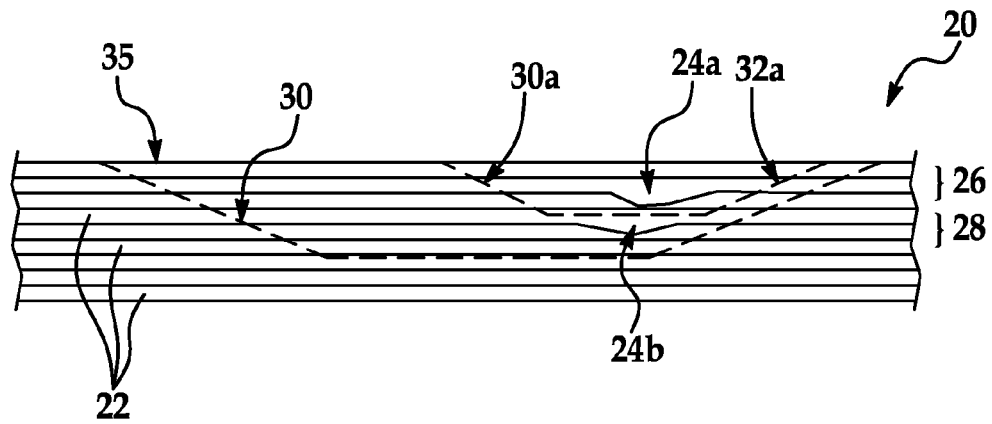
FIG. 1 is an illustration of a sectional view of a laminated composite structure having out-of-tolerance areas in which a area to be removed from the structure is indicated by the dashed line.

FIG. 1 illustrates a typical composite structure 20 comprising a plurality of laminated plies 22 of composite material which may be, for example and without limitation, a fiber reinforced resin. Although not shown in the Figure, the composite structure 20 may include one or more cores to provide additional stiffness or other structural properties. In the illustrated example, the composite structure 20 includes two out-of-tolerance areas 24a, 24b respectively located in differing layers 26, 28 of the plies 22 beneath the surface 35. As used herein, "out-of-tolerance" and "out-of-tolerance area" refer to localized areas in the composite structure 20 that may have undesired properties or features, or which may be outside of designed tolerances or which may not meet product or performance specifications for any of variety of reasons. An out-of-tolerance area may comprise, for example and without limitation, any of numerous types of inconsistencies, a void, a dent, a ply separation, thermal degradation, a ply wrinkle, disbanding or a porosity that may occur at the time the composite structure 20 is manufactured, or later during the service life of the composite structure 24. In accordance with the disclosed embodiments, one or more volumes 30, 30a of material may be removed from the composite structure 20 that are respectively inclusive of out-of-tolerance areas 24a, 24b in order to eliminate or reduce the size of the out-of-tolerance areas 24a, 24b. The volume 30, 30a of material removed from the composite structure 20 may have an outline or periphery that may be of any various geometries, including but not limited to round and oval shapes.

Figure 2:
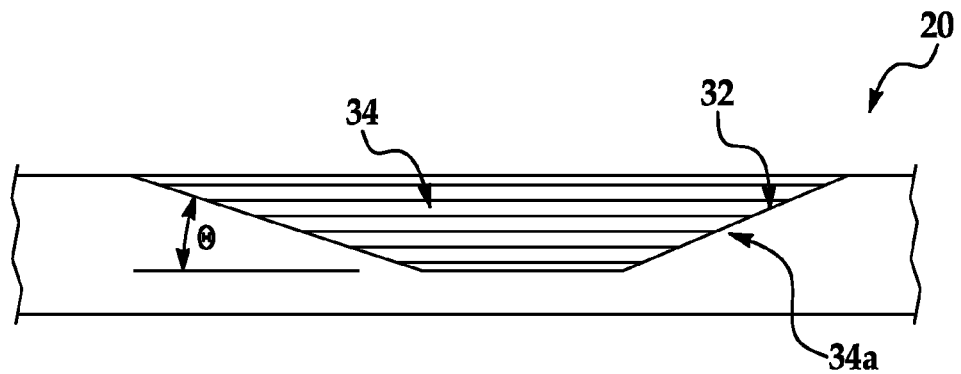
FIG. 2 is an illustration similar to FIG. 1 showing a completed restoration in which material has been removed and replaced by a bonded patch.

Referring now also to FIG. 2, the volume 30 of material shown in FIG. 1 is removed in a manner so as to form an outer peripheral scarf 32 that is tapered or inclined at a pre-selected scarf angle θ. A preformed composite patch 34, which may comprise without limitation, multiple plies of composite material, may be bonded to the composite structure 20 and fills the volume 30 of material that has been previously removed. The peripheral edges 34a of the patch 34 substantially match the scarf angle θ so as to form a bonded scarf joint 32 between the patch 34 and the composite structure 20.

Figure 3A:
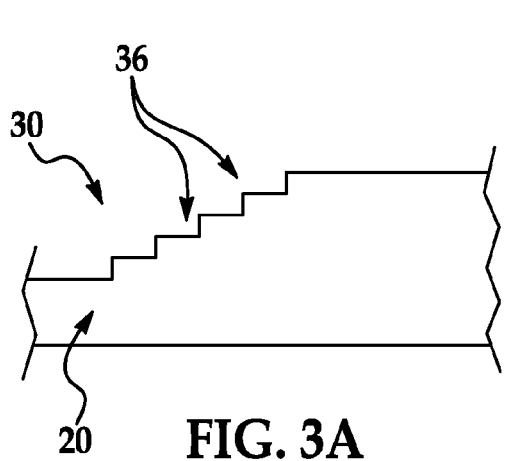
FIG. 3A is an illustration of a sectional view showing an out-of-tolerance area having been removed from a composite structure in which tapered edges are provided with step laps in preparation for a patch.
Figure 3B:
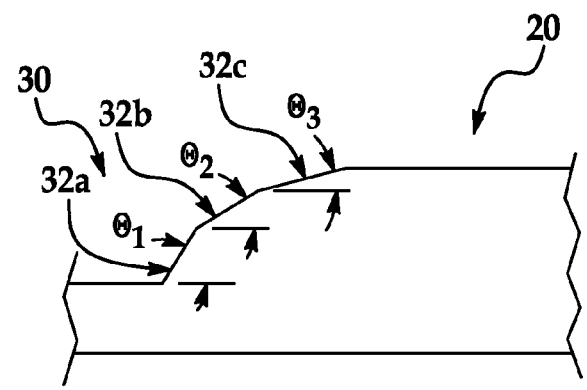
FIG. 3B is an illustration similar to FIG. 3A, but showing a scarfed edge having multiple scarf angles.

While a scarf joint 32 as shown in FIG. 2 may be desirable for many applications, it may also be possible to remove the volume 30 of material from the composite structure 20 so as to form a series of peripheral step laps 36, as shown in FIG. 3A, in which the height of each of steps lap 36 substantially matches the thickness of a corresponding ply 22 (FIG. 1). The peripheral step laps 36 may substantially match a series of similar step laps (not shown) on a patch (not shown) to form a step lap joint (not shown) between the patch 34 and the composite structure 20. Similarly, as shown in FIG. 3B, material may be removed from the composite structure 20 during the restoration process so as so form a series of substantially contiguous scarfs 32a, 32b, 32c respectively having differing scarf angles $\theta_1$, $\theta_2$, $\theta_3$. The multiple scarfs 32a, 32b, 32c formed during removal of the volume 30 of material from the composite structure 20 may match corresponding scarfs (not shown) on the patch 34.

Figure 4:
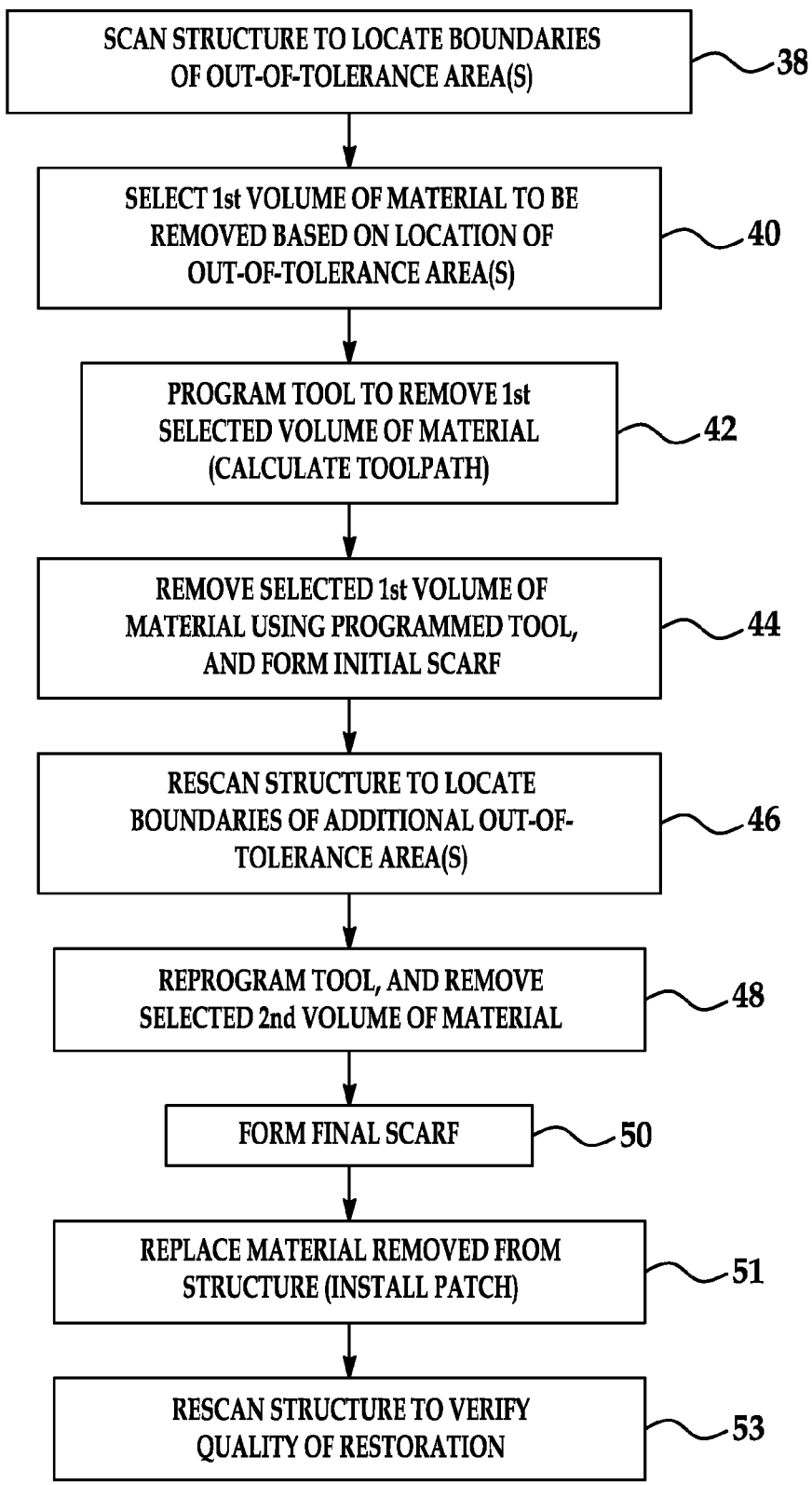
FIG. 4 is an illustration of a flow diagram of an automated method for removing material from a composite structure.

Attention is now directed to FIG. 4 which broadly illustrates the steps of a method of restoring a composite structure 20, that includes automated removal of one or more out-of-tolerance areas 24 (FIG. 1) in the structure 20. Beginning at step 37, the surface 35 of the structure 20 is scanned to achieve machine-to-structure alignment using a device such as a triangulation/line scan laser or touch probe to measure distance. Alternatively, a laser tracker (not shown) or a laser positioning system (not shown) may be used to locate the machine tool 52 relative to the structure 20, in a known x, y, z coordinate system, such as the coordinate system of an aircraft of which the structure 20 forms a part, so that when the machine tool 52 is located, a database may be used to identify the geometry. After multiple points on the surface 35 are measured, the surface information is stored and used to calculate the machine-to-structure alignment. Then, at step 38, the structure 20 is internally scanned to locate the boundaries of one or more non-conforming areas 24a, 24b which may require removal as part of the restoration process. As will be discussed below in more detail, the scanning process may be carried out using any of a variety of nondestructive inspection techniques, including those using ultrasonics. At 40, a first, initial volume 30a of material within the structure 20 that must be removed is selected, based on the location of an out-of-tolerance area identified during the scanning step 38. In the example illustrated in FIG. 1, the out-of-tolerance areas identified during the initial scanning process may be limited to the out-of-tolerance area 24a, since the out-of-tolerance area 24b may be obscured by the overlying out-of-tolerance area 24a and therefore not detectable during the initial scanning step. Thus, the first, initial volume 30a of material removed from the structure 20 may be limited to the layer 26 which contains the out-of-tolerance area 24a.

Next, at step 42, a machine tool (not shown) is programmed to remove the first selected volume 30a of material. The process of programming the machine tool may include calculating a toolpath to be followed by a material removal tool (not shown), such as a mill or other cutting tool that is automatically controlled by a suitable numerical controller, as will be discussed later in more detail. The toolpath having been calculated at 42, the machine tool may then be used at step 44 to remove the first selected volume 30a of material. As the first selected volume 30a of material is being removed at step 44, an initial scarf 32a (FIG. 1) may be formed which may have a scarf angle that may be the same or different than a final scarf angle θ.

Once the first selected volume 30a of material has been removed, the structure 20 is rescanned at step 46 in order to locate the boundaries of any additional out-of-tolerance areas 24 that may be present beneath the newly exposed surface of the structure 20. In the example shown in FIG. 1, the rescanning process may result in the location of the boundaries of the out-of-tolerance area 24b which resides in a layer 28 of material that is beneath the already removed layer 26 of material containing the out-of-tolerance area 24a. At step 48, the machine tool is reprogrammed and used to remove a second selected volume 30 of material which again, in the case of the example shown in FIG. 1, includes the layer 28. The steps of rescanning the structure 20 to locate the boundaries of additional out-of-tolerance areas, reprogramming the machine tool and removing the selected volumes of material are repeated until no further out-of-tolerance areas 24 are identified during internal scanning of the structure 20.

When all of the out-of-tolerance areas 24 have been identified and removed, the final scarf 32 may be formed at step 50, using the material removal tool, so that the scarf has the desired scarf angle θ. At step 51, the material that has been removed from the structure 20 may be replaced by an integrated patch 34. If desired, the restored structure 20 may be rescanned at step 53 in order to verify the desirability of the completed rework or restoration.

Figure 5:
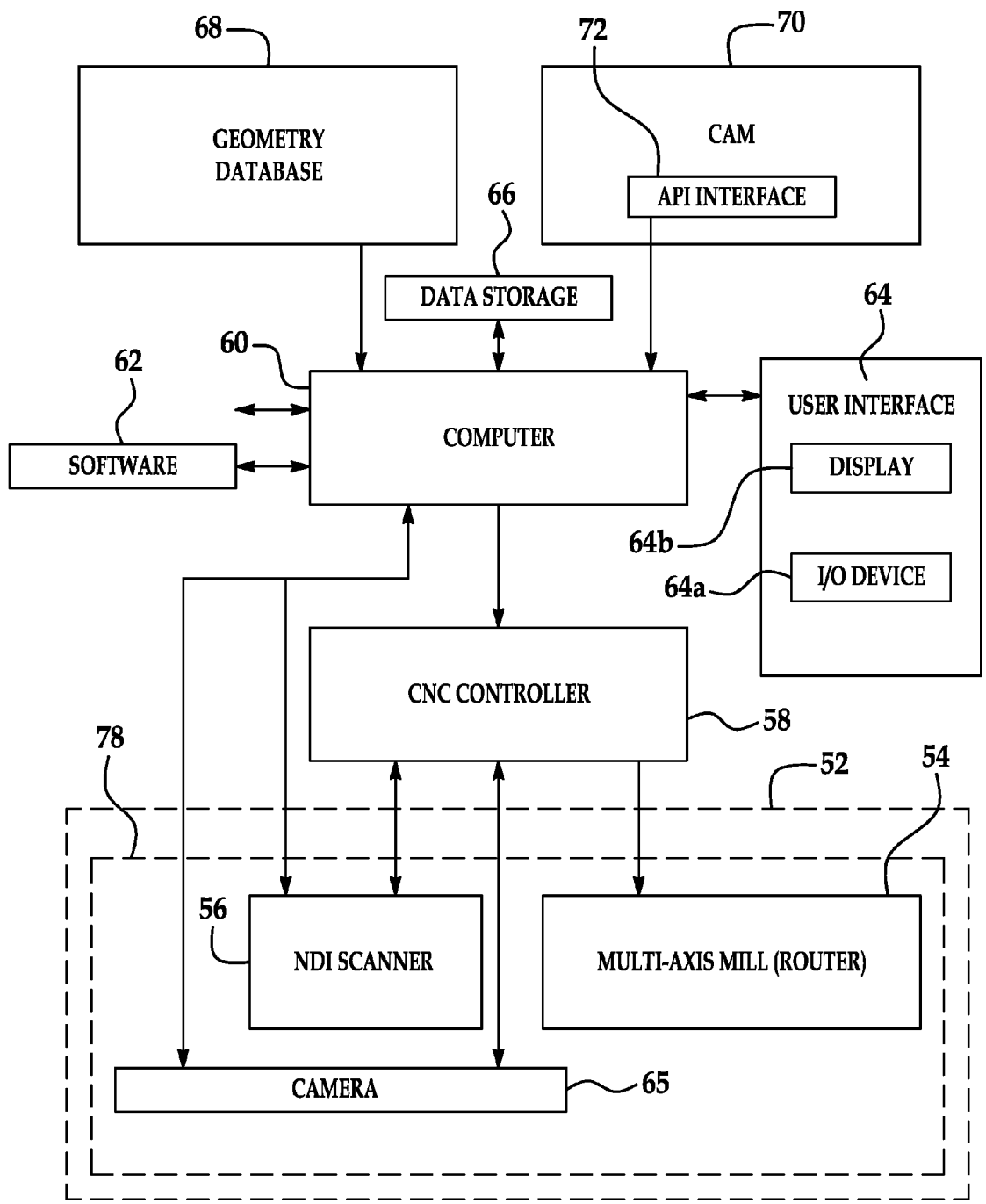
FIG. 5 is an illustration of a block diagram of apparatus for automated material removal in a composite structure that may be employed to carry out the method illustrated in FIG. 4.

FIG. 5 illustrates, in block diagram form, the basic components of apparatus that may be used to carry out the material removal method described above. A machine tool 52 includes a nondestructive inspection (NDI) scanner 56, a multi-axis mill or router 54, a distance measuring device 57 and an optional camera 65 mounted on a machine tool head 78. The distance measuring device 57 may comprise a triangulation or line scan laser to measure the distance between the machine tool 52 and the surface 35 of the structure 20. After multiple points on the structure surface 35 are measured by the device 57, the surface information is stored and used to calculate machine-to-structure alignment. The NDI scanner 56 may comprise any of a variety of devices using known technologies to essentially map internal areas of the structure 20. For example, and without limitation, the scanner 56 may employ high and low frequency ultrasound including pulse echo ultrasonic techniques, ultrasonic resonance, infrared thermography, laser shearography, backscatter X-ray, electro-magnetic sensing, terahertz and video, to name only a few. The camera 65 may comprise a solid state camera or similar optical recording array for viewing and recording images of the material being removed by the mill 54. Movement of the machine tool head 78 over the surface of the composite structure 20, as well as operation of the scanner 56, router 54 and camera 65 are controlled by a CNC (computer numerically controlled) controller 58. Information generated by the scanner 56 may be delivered to a computer 60 which may be used to program the CNC controller 58 to remove the material on a ply-by-ply basis. Similarly, image information generated by the camera 65 is sent to the computer 58 for analysis and/or display to a user.

The computer 60 may be controlled by one or more software programs 62, and may have access to one or more geometry databases 68 which contain information defining the geometry and ply make-up of one or more composite structures 20 that are to be restored or reworked. The computer 60 may also be coupled with a computer automated manufacturing system (CAM) 70 which interfaces with the computer 60 via an application programming interface (API) 72. A user interface 64 may be provided which includes an I/O (input/output) device 64a and a display 64b in order to allow a user to view and alter information developed by the computer 60 that is used to program the CNC controller 58, including the particular plies 22 to be removed. The computer 60 may be provided with data storage 66 to allow storage and retrieval of archival data related to past restorations or reworks performed on various composite structures.

Figure 6:
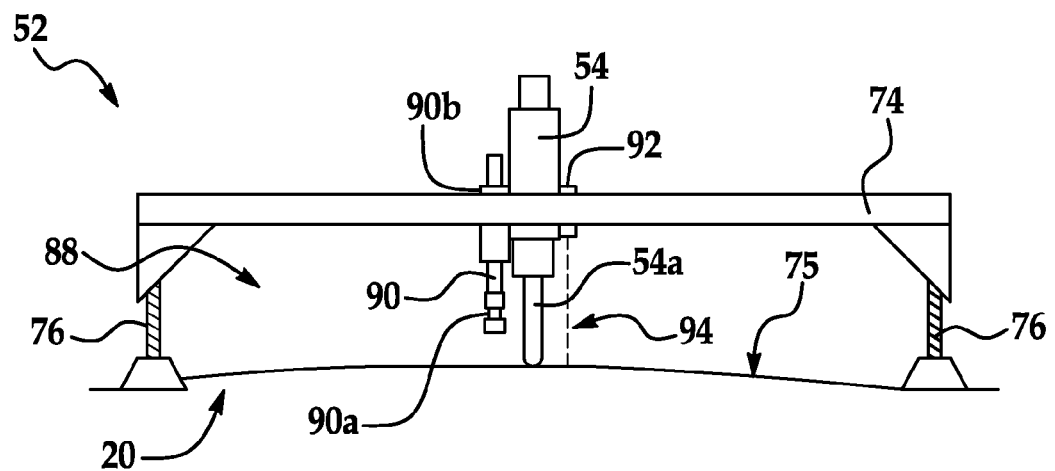
FIG. 6 is an illustration of a side view of a machine tool forming part of the apparatus shown in FIG. 5.
Figure 7:
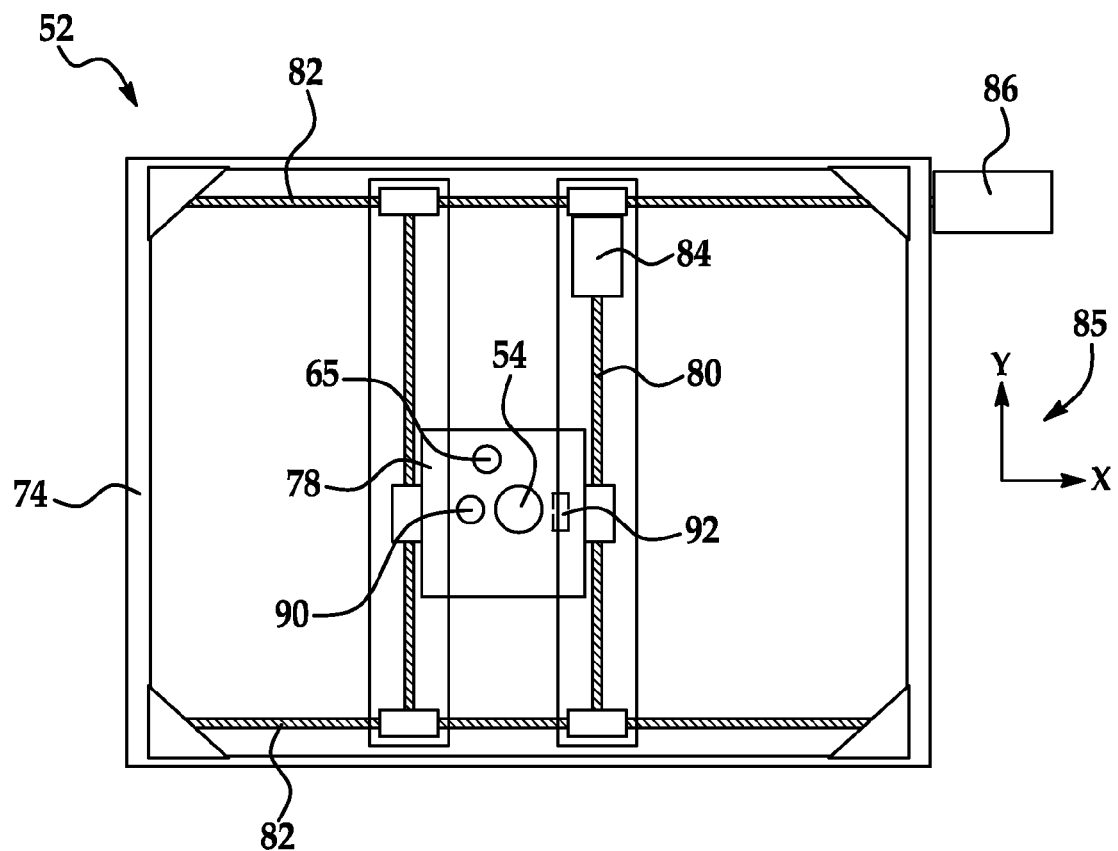
FIG. 7 is an illustration of a plan view of the machine tool shown in FIG. 6.

FIGS. 6 and 7 illustrate additional details of the machine tool 52 which forms part of the apparatus shown in FIG. 5. The machine tool 52 includes a frame 74 removably supported on the surface 75 of the composite structure 20 by legs 76, which may be adjustable in height to allow adjustment of the height of the frame 74 above the surface 75 of the composite structure 20. Although not shown in the drawings, the area 88 beneath the frame 74 may be enclosed and connected with a vacuum (not shown) in order to evacuate material that is being removed from the composite structure by the machine tool 52. The previously mentioned machine tool head 78 is mounted for movement along orthogonal x-y axes 85 on the frame 74 by means of a pair of screwdrives or belt drives 80, 82 respectively powered by electric stepper or servo motors 84, 86. Further, although not shown in the drawings, a Z axis drive motor and rail with screw or belt may be provided to position the components of the head vertically. Thus, the head 78 may be precisely moved along the orthogonal axes 85 to any of various positions over the surface 75 of the composite structure 20.

A machine tool drive 54, which may comprise a pneumatic, hydraulic or electric motor, is mounted on the head 78 and includes a rotating cutting tool 54a. The tool 54a may comprise a mill, router or similar tool which may be both rotated (via a spindle) and vertically displaced (along the Z axis) by the drive head 54 in order to remove material from the composite structure 20. A laser displacement unit 92 mounted on the head 78, directs a laser beam 94 onto the surface 75 of the composite structure 20 in order to develop depth-of-cut and machine-to-part orientation information that is used in controlling the drive head 54. An ultrasonic sensor 90 having a spring loaded riding dribbler head 90a is mounted on the head 78 by means of a retractable sensor mount 90b. The dribbler head 90a of the sensor 90 may be displaced downwardly into contact with the surface 75 of the composite structure 20 in order to internally scan the composite structure 20 to locate the boundaries of out-of-tolerance areas 24. The camera 65 is mounted on the head 78 and oriented to view the area of the cutting tool 54a so as to record either periodically or continuously, images of the material being removed. These images may be displayed to a user on the user display 64b and/or used by the computer 60 to control the operation of the head, including the cutting tool 54a.

Figure 8A:
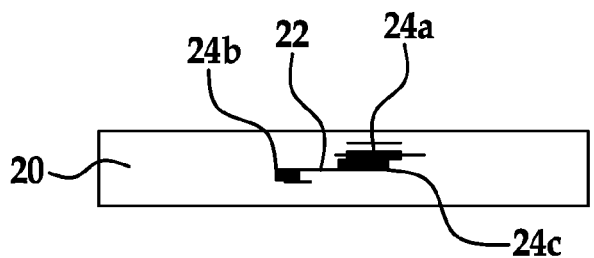
FIGS. 8A-8H are illustrations of diagrams showing the progressive steps of a method for restoring out-of-tolerance areas in a composite structure.
Figure 8B:
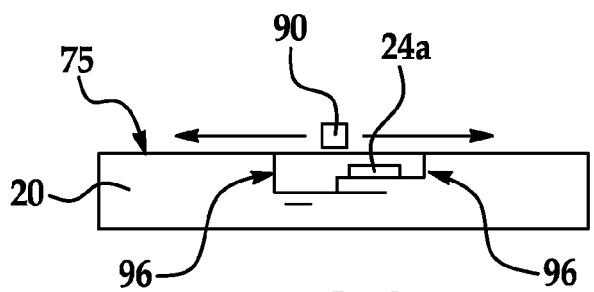
Figure 8C:
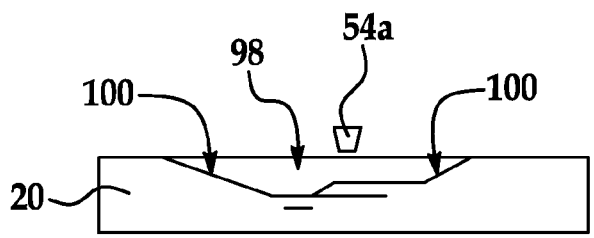

Attention is now directed to FIGS. 8A-8H which diagrammatically illustrate a method of restoring a composite structure having out-of-tolerance areas 24a, 24b, 24c, using the apparatus shown in FIGS. 5-7. FIG. 8a illustrates a composite structure 20 comprising multiple plies 22 having known or suspected out-of-tolerance areas 23a, 24b, 24c. As shown in FIG. 8B, the machine tool 52 (FIG. 7) may be used to scan the ultrasonic sensor 90 over the surface 75 of the composite structure 20 where out-of-tolerance areas are indicated or suspected. The initial scanning process performed in FIG. 8B may detect and locate approximate boundaries 96 of an out-of-tolerance area 24a. Based on the boundaries 96 of the out-of-tolerance area 24a, a first volume 98 of material is calculated that is to be removed by the cutting tool 54a, as shown in FIG. 8C, which includes the out-of-tolerance area 24a. A toolpath (not shown) used to guide the movement of the cutting tool 54a is calculated by the computer 60 (FIG. 5) and is used to program the CNC controller 58 which controls the movement of the head 78, including the cutting tool 54a. During removal of the first volume 98 of material, the cutting tool 54a forms an initial scarf 100 (FIG. 8C) around the periphery of the volume 98 of material that has been removed.

Figure 8D:
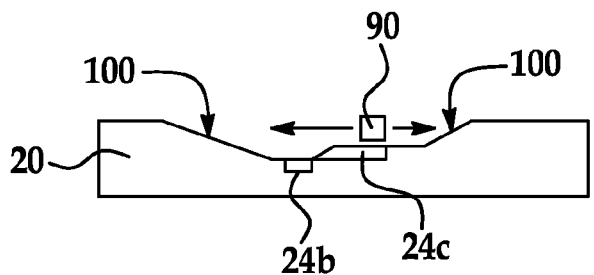
Figure 8E:
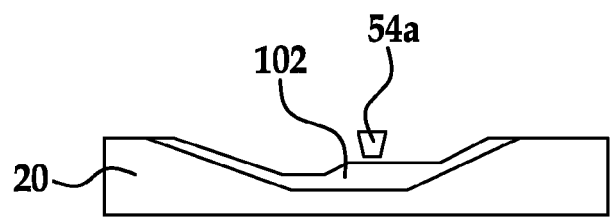
Figure 8F:
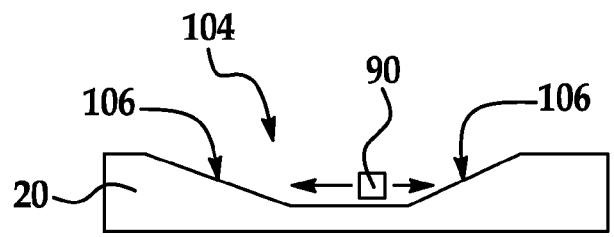

Next, as shown in FIG. 8D, the ultrasonic sensor 90 is used to re-scan the composite structure 20 in order to locate the boundaries of possible additional out-of-tolerance areas 24b, 24c at deeper levels in the structure 20 that may have been previously obscured by the overlying out-of-tolerance area 96. Based on the located boundaries of the additional out-of-tolerance areas 24b, 24c, a second, additional volume 102 of material (FIG. 8E) is calculated which includes the out-of-tolerance areas 24b, 24c. Based on the boundaries of the additional out-of-tolerance areas 24b, 24c, the CNC controller 58 (FIG. 5) is re-programmed with a new toolpath for the tool 54a that will result in the removal of the second volume 102 of material. FIG. 8F illustrates the second volume 102 of material having been removed and a final scarf 106 having been formed that includes the desired scarf angle θ (FIG. 2). At this point, the sensor 90 may be used to re-scan the composite structure 20 to determine whether there are any further out-of-tolerance areas that have not been previously detected.

Figure 8G:
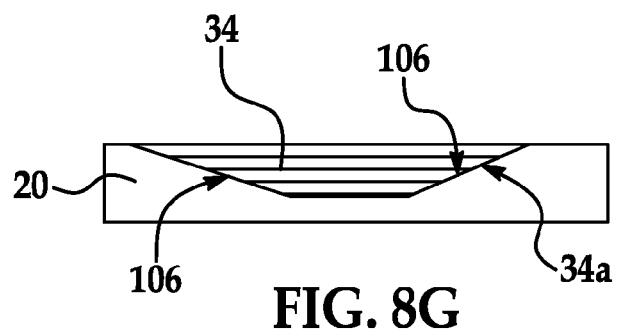
Figure 8H:
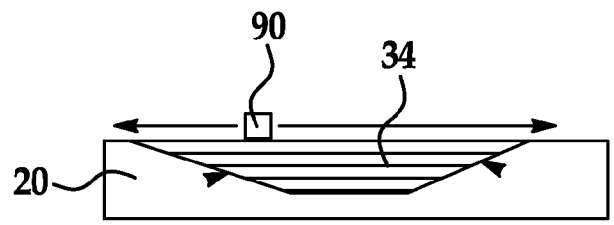

Referring to FIG. 8G, once all the out-of-tolerance areas have been removed from the composite structure 20, a composite patch 34 may be fabricated and bonded to the composite structure 20 in order to replace the material removed from the structure 20. The computer 60 (FIG. 5) may be used to calculate the number, size and type of plies needed to fabricate the patch 34 based in part on the volumes 98, 102 of material removed that were previously calculated by the computer 60. The patch 34 may include a scarf 34a that substantially matches the final scarf 106 on the composite structure 20. After the patch 34 has been bonded to the composite structure 20, the restoration, including the patch 34 may be rescanned with the sensor 90, as shown in FIG. 8H in order to verify the integrity and the quality of the restoration.

Figure 9:
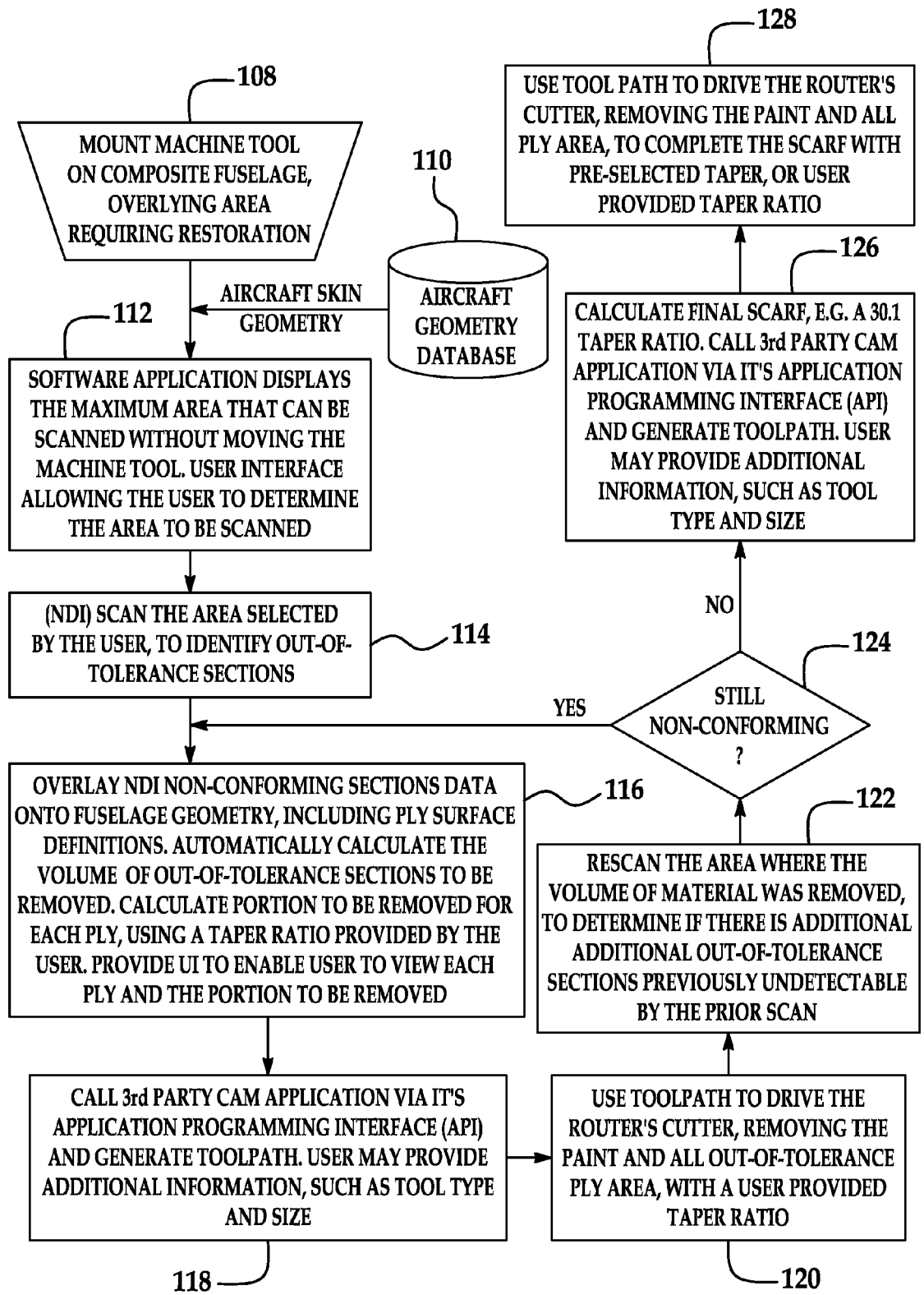
FIG. 9 is an illustration of a flow diagram of a method of automated material removal used in the restoration of composite aircraft structures.
Figure 11:
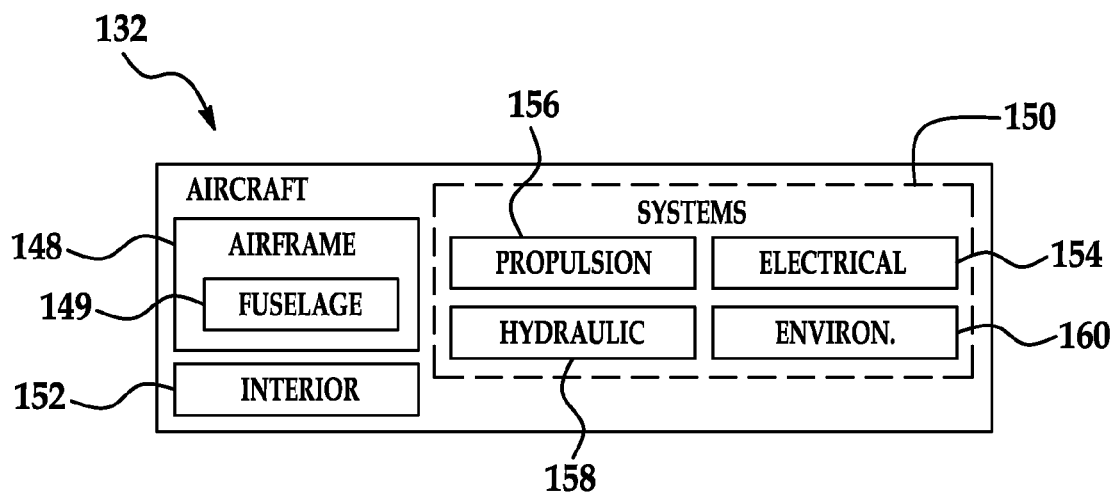
FIG. 11 is an illustration of a block diagram of an aircraft.

Attention is now directed to FIG. 9 which illustrates a method of removing out-of-tolerance areas in a composite aircraft 132 (FIG. 11), which may be for example and without limitation, an exterior aircraft skin (not shown) formed of composite materials. Beginning at 108, the machine tool 52 (FIGS. 6 and 7) may be mounted on a fuselage 149 (FIG. 11) of the aircraft 132, overlying and encompassing a section of the skin requiring restoration. Also at 108, a laser tracker or laser positioning system locates the machine tool relative to the fuselage 149 (FIG. 11) within a known coordinate system, which may be the coordinate system of the aircraft 132 (FIG. 11). The computer 60 (FIG. 5) may be used to retrieve aircraft skin geometry from an aircraft geometry database 110, which may form part of the geometry database 68 previously described in connection with FIG. 5. At 112, the software 62 causes the computer 60 to display on the visual display 64b (FIG. 5), the maximum area on the fuselage that can be scanned without moving the machine tool 52. The user interface 64 also allows the user to determine the particular area on the fuselage to be scanned.

At 114, the section on the fuselage selected by the user is scanned in order to identify any out-of-tolerance areas. At 116, data representing the out-of-tolerance areas identified at step 114 are overlaid on the aircraft fuselage skin geometry retrieved from the database at 110, including ply surface definitions. Using this overlaid information, the volume of material that must be removed which includes the out-of-tolerance areas is automatically calculated. These calculations include calculating the portion to be removed for each ply in the composite structure, using a taper ratio (scarf angle) provided by the user. The user interface 64 allows a user to view each ply of the skin, including the portion to be removed from each ply.

At step 118, the computer 60 accesses the CAM application 70 (FIG. 5) via the API interface 72 and uses the CAM application 70 to generate a toolpath for the cutting tool 54a. The user may employ the user interface 62 to input additional information used to program the machine tool 52, such as the type of tool to be used, size of the tool, etc. At step 120, the generated toolpath is then used to direct the movement of the cutting tool 54a which removes the calculated volume of material that contains the out-of-tolerance areas while forming a user defined taper angle (scarf angle).

Next, at step 122, the section of the fuselage skin where the volume of material is removed is rescanned to determine if there are additional out-of-tolerance areas previously undetectable by the prior scan due to overlying out-of-tolerance areas.

At 124, a determination is made of whether the fuselage skin still contains out-of-tolerance areas. If the answer is yes, steps 116, 118, 120 and 122 are repeated. Otherwise, the process proceeds to step 126 where a final scarf angle or taper ratio, which may be, for example and without limitation, 30:1, is calculated. The CAM application 70 is then called up and a toolpath is generated which will result in removing additional material required to produce a final scarf angle. Again, the user may provide additional information during this step, such as the type and size of the tool to be used. Finally, at step 128, using the toolpath generated at step 126, the cutting tool 54a removes the paint and ply area necessary to complete the scarf with a pre-selected or user scarf angle or taper ratio.

Figure 10:
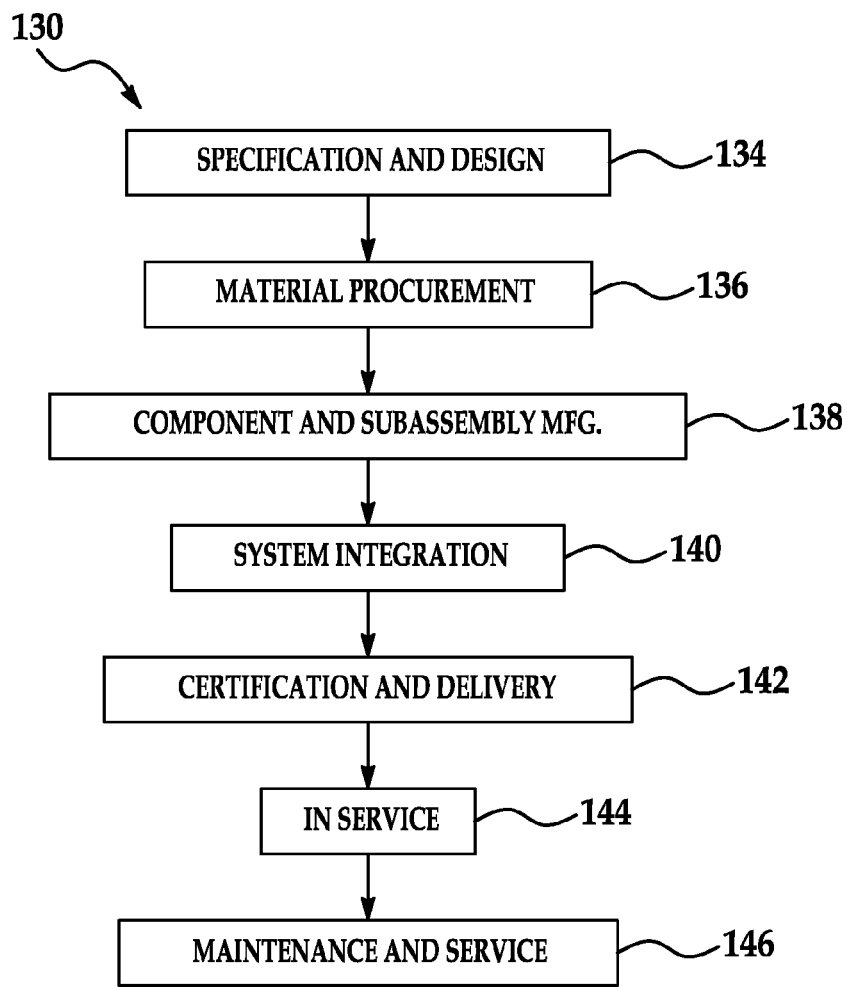
FIG. 10 is an illustration of a flow diagram of aircraft production and service methodology.

Embodiments of the disclosure may find use in a variety of potential applications, particularly in the transportation industry, including for example, aerospace, marine and automotive applications. Thus, referring now to FIGS. 10 and 11, embodiments of the disclosure may be used in the context of an aircraft manufacturing and service method 130 as shown in FIG. 10 and an aircraft 132 as shown in FIG. 11. During pre-production, exemplary method 130 may include specification and design 134 of the aircraft 132 and material procurement 136 in which the disclosed method and apparatus may be specified for use in restoring or reworking areas of composite parts or components used in the aircraft 132. During production, component and subassembly manufacturing 138 and system integration 140 of the aircraft 132 takes place. The disclosed method and apparatus may be used to restore or rework sections of composite parts or components used in the aircraft 132 during these production processes. Thereafter, the aircraft 132 may go through certification and delivery 142 in order to be placed in service 144. While in service by a customer, the aircraft 132 is scheduled for routine maintenance and service 146 (which may also include modification, reconfiguration, refurbishment, and so on). The disclosed method and apparatus may be used to restore or rework composite parts on the aircraft 132 during the maintenance and service 146.

Each of the processes of method 130 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 132 produced by exemplary method 130 may include an airframe 148 with a plurality of systems 150 and an interior 152. The airframe 148 may include a composite fuselage 149. The disclosed method and apparatus may be used to restore or rework composite parts which form part of, or may be installed on the airframe 148, including the fuselage 149. Examples of high-level systems 150 include one or more of a propulsion system 156, an electrical system 154, a hydraulic system 158, and an environmental system 160. Any number of other systems may be included. Although an aerospace example is shown, the principles of the disclosure may be applied to other industries, such as the marine and automotive industries.

The disclosed method and apparatus may be employed to restore or rework composite parts during any one or more of the stages of the production and service method 130. For example, components or subassemblies corresponding to production process 130 may be reworked or restored using the disclosed method and apparatus. Also, one or more method embodiments, or a combination thereof may be utilized during the production stages 138 and 140, for example, by substantially expediting assembly of or reducing the cost of an aircraft 132. Similarly, the disclosed method and apparatus may be used to restore or rework composite parts that are utilized while the aircraft 132 is in service.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of restoring a composite structure containing an out-of-tolerance area, comprising:
    determining the location of a first out-of-tolerance area within the structure, said determining comprising internally scanning said structure with a non-destructive scanner to map internal areas of the structure including moving a scanner over a surface of the structure;
    identifying a boundary for the first out-of-tolerance area;
    calculating a volume of the structure to be removed based on the boundary of the first out-of-tolerance area, said calculating comprising calculating a portion of material to be removed that includes the first out-of-tolerance areas, said calculating comprising using a scarf angle to be formed at the periphery of said volume;
    programming a machine tool to remove the calculated volume;
    removing the calculated volume using the programmed machine tool to form an exposed surface;
    scanning the exposed surface of the composite structure to determine a location of a second out-of-tolerance area; and,
    replacing the volume of the structure removed by the machine tool.

2. The method of claim 1, wherein calculating the volume to be removed includes:
    selecting a layer to be removed from the structure, and selecting an angle for a scarf along the edges of the layer.

3. The method of claim 1, wherein removing the calculated volume includes forming a scarf around the edges of the removed volume.

4. The method of claim 3, wherein calculating a volume of material to be removed includes selecting an angle for the scarf.

5. The method of claim 1, wherein the structure is a multi-ply laminate and calculating the volume to be removed includes calculating the amount of material to be removed from each of the plies.

6. The method of claim 1, wherein replacing the volume of structure removed includes bonding a composite patch to the structure.

7. A method of removing one or more out-of-tolerance areas in a composite structure, comprising:
    locating the boundaries of the out-of-tolerance area within the structure, said locating comprising internally scanning said structure with a non-destructive scanner to map internal areas of the structure including moving a scanner over a surface of the structure;
    using the located boundaries to calculate a volume of material in the structure to be removed that includes the out-of-tolerance area, said calculating comprising using a scarf angle to be formed at the periphery of said volume;
    calculating a toolpath used to guide a tool for removing material from the structure;
    programming a controller with the calculated toolpath;
    removing the volume of material from the structure using the tool, including using the programmed controller to control the tool, the removing a volume forming an exposed surface; and
    scanning the exposed surface to identify a second out-of-tolerance area.

8. The method of claim 7, wherein scanning the structure comprises using at least one of:
    high and low frequency ultrasound, ultrasonic resonance, infrared thermography, laser shearography, backscatter x-ray, electromagnetic sensing, terahertz, and video.

9. The method of claim 7, wherein removing the material from the structure includes forming a scarf along the periphery of the volume of material removed from the structure.

10. The method of claim 9, further comprising:
    selecting an angle for the scarf, and
    wherein calculating the toolpath includes calculating a toolpath for forming a scarf having the selected scarf angle.

11. The method of claim 7 wherein:
    locating the boundaries of the out-of-tolerance areas and removing the volume of material are performed by moving a machine head across the structure.

12. The method of claim 7, wherein locating the boundaries, calculating the volume of material to be removed and removing the material are iteratively performed to remove multiple layers of the structure each containing an out-of-tolerance area.

13. The method of claim 7, further comprising:
    retrieving data from a database defining the geometry of the structure, and
    wherein calculating the volume of material includes overlaying the determined boundaries of the out-of-tolerance area and the data defining the geometry of the structure.

14. The method of restoring a composite structure according to claim 1 further comprising the step of prior to said replacing step and after said removing step, rescanning and verifying the area where the volume of material has been removed.

15. The method of removing one or more out-of-tolerance areas according to claim 7 further comprising the step of after said removing step, rescanning and verifying the area where the volume of material has been removed.

16. The method of claim 1, wherein the second out-of-tolerance area is positioned under the first out-of-tolerance area relative to a surface of the composite structure.

17. The method of claim 1 further comprising the steps of:
    calculating a volume for the second out-of-tolerance area; and
    removing the volume for the second out-of-tolerance area.

* * * * *